United States Patent
Pfeiffer et al.

(10) Patent No.: US 6,719,500 B2
(45) Date of Patent: *Apr. 13, 2004

(54) SYSTEM FOR PNEUMATICALLY CONVEYING BULK PARTICULATE MATERIALS

(75) Inventors: John W. Pfeiffer, Hughesville, PA (US); James E. Mothersbaugh, Muncy, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/223,381

(22) Filed: Aug. 20, 2002

(65) Prior Publication Data

US 2004/0037658 A1 Feb. 26, 2004

(51) Int. Cl.[7] .............................................. B65G 53/38
(52) U.S. Cl. ........................................... 406/91; 406/95
(58) Field of Search ............................... 406/46, 89, 90, 406/91, 93, 94, 95, 138; 414/328, 397

(56) References Cited

U.S. PATENT DOCUMENTS

| | | | | |
|---|---|---|---|---|
| 1,553,476 A | * | 9/1925 | Schuster .......................... 366/5 |
| 3,040,760 A | * | 6/1962 | Macks ........................... 137/13 |
| 3,253,865 A | * | 5/1966 | Kanics ........................... 406/86 |
| 3,604,758 A | * | 9/1971 | Flain et al. ...................... 406/50 |
| 3,708,207 A | * | 1/1973 | Steele ........................... 406/93 |
| 4,116,491 A | * | 9/1978 | Ply ............................... 406/89 |
| 4,183,702 A | * | 1/1980 | Bonnel ........................... 406/56 |
| 4,220,426 A | * | 9/1980 | Ply ............................... 406/89 |
| 4,775,267 A | * | 10/1988 | Yamamoto ...................... 406/50 |
| 4,830,545 A | * | 5/1989 | Salter et al. .................... 406/12 |
| 5,722,802 A | * | 3/1998 | March ........................... 406/46 |
| 6,227,768 B1 | * | 5/2001 | Higuchi et al. ................. 406/89 |

* cited by examiner

*Primary Examiner*—Joseph A. Dillon
(74) *Attorney, Agent, or Firm*—Stevens, Davis, Miller & Mosher, LLP

(57) ABSTRACT

A system for pneumatically conveying bulk particulate materials generally consisting of a material transport line including a first conduit formed of a gas permeable material providing a material flow passageway having an inlet and an outlet, a second conduit formed of a gas impermeable material, encompassing and spaced from the first conduit, and a plurality of partition walls disposed between the conduits and spaced along the lengths thereof, defining a plurality of plenums; a nozzle connectable to a source of gas under pressure, inserted into the passageway for injecting gas under pressure therein to impel material disposed in the passageway toward the outlet thereof; a main gas supply line connectable to a source of gas under pressure having branch lines each communicable with a plenum; and each of the branch lines having a pressure regulating means.

47 Claims, 3 Drawing Sheets

SYSTEM FOR PNEUMATICALLY CONVEYING BULK PARTICULATE MATERIALS

This invention relates to the handling of bulk particulate solids and more particularly to a system for pneumatically conveying such materials in a simple, efficient and economical manner.

BACKGROUND OF THE INVENTION

In the chemical processing and other industries, pneumatic conveying systems commonly are used to transport bulk particulate materials of various properties. The parameters of such systems generally are pressure drop, gas flow rate and conveying rate. Whether such systems are dilute phase or dense phase systems, they tend to incur a great many problems which impair their performance including less than desirable conveying rate, repeated line plugging, product degradation, excessive wear and vibration. Such problems further are exacerbated not only because of the construction or operation of the systems but because of the nature of the material being conveyed including its moisture, temperature and particle size. Accordingly, it is the principal object of the present invention to provide an improved system for pneumatically conveying dry, fine particle size material, at low velocity, in the dense phase, effectively and efficiently without undue wear on the system, degradation of product or excessive use of energy.

SUMMARY OF THE INVENTION

The aforementioned problems of prior art pneumatic conveying systems are largely overcome by the present invention in providing a system generally consisting of a material transporting line including a first conduit formed of a gas permeable material, providing a material flow passageway having an inlet and an outlet, a second conduit formed of a gas impermeable material, encompassing and spaced from the first conduit and a plurality of partition walls disposed between the conduits and spaced along the lengths thereof, defining a plurality of plenums; a nozzle connectable to a source of gas under pressure, projecting into such passageway for injecting a gas under pressure therein to impel material disposed in the passageway toward the outlet thereof; a gas supply line connectable to a source of gas under pressure, having branch lines each communicating with a plenum; and each of the branch lines having a pressure regulating means. The pressure regulating means provided in such branch lines supplying gas under pressure to the plenums may consist of different sized orifices or pressure regulating valves which may be designed to vary the pressures in the plenums along the length of the transport line. Material to be conveyed through the passageway of the transport line may be gravity fed or force-fed under pressure from a vessel, hopper, another transport line or any other means. In addition, multiple discharge segments provided with outlets of different cross sectional configurations may be provided which may be selectively, detachably mounted on the main body of the transport line.

DETAILED DESCRIPTION OF AN EMBODIMENT OF THE INVENTION

Figures 1, 1A:
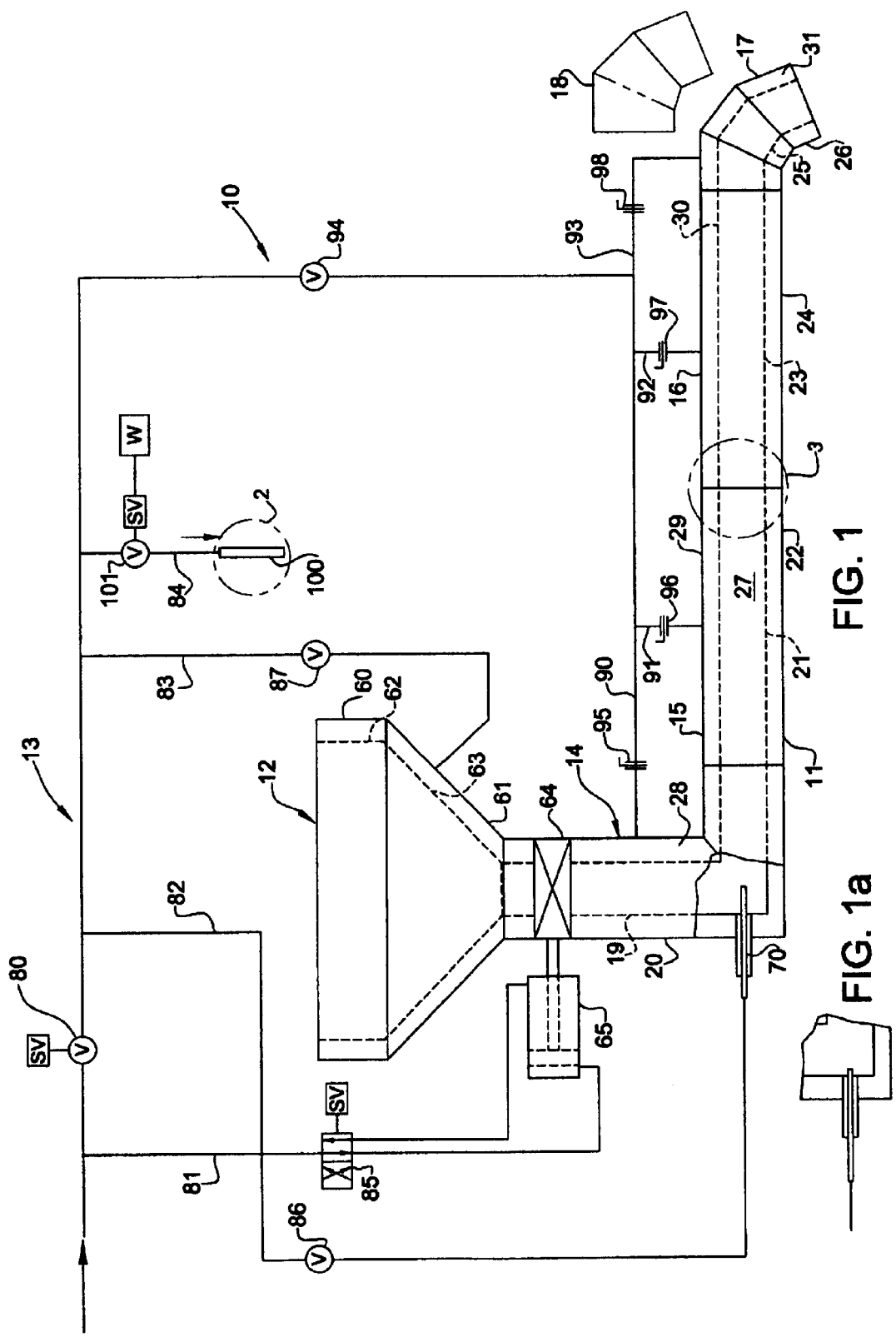
FIG. 1 is a schematic view of a pneumatic conveying system embodying the present invention.
FIG. 1a is a partial view of the transport line shown in FIG. 1, illustrating an alternate position of a nozzle forming part of the system.

Referring to FIG. 1 of the drawings, there is shown a schematic view of a system 10 for pneumatically conveying bulk particulate materials, generally consisting of a material transport line 11, a hopper 12 and a gas supply line 13. The transport line includes an inlet section 14, at least two intermediate sections 15 and 16 and at least two interchangeable outlet sections 17 and 18, connected together in end-to-end relation. Inlet section 14 includes an inner, gas permeable conduit 19 and an outer, gas,impermeable conduit 20 encompassing and spaced from conduit 19. Section 15 includes an inner conduit 21 formed of a gas permeable material and communicating with conduit 19 of section 14, and an outer, gas impermeable conduit 22 encompassing and spaced from conduit 21. Intermediate section 16 is similar to section 15 including an inner-conduit 23 formed of a gas permeable material and communicating with conduit 21 and an outer conduit 24 formed of a gas impermeable material encompassing and spaced from inner conduit 23. Outlet section 17 also includes an inner conduit 25 formed of a gas permeable material and communicating with inner conduit 23 and outer conduit 26 formed of a gas impermeable material encompassing and spaced from inner conduit 25. Interchangeable section 18 is similar to outlet section 17 with the exception of providing an inner, gas permeable conduit having a different cross-sectional area than the cross-sectional area of inner, gas permeable conduit 25 of section 17.

Figure 3:
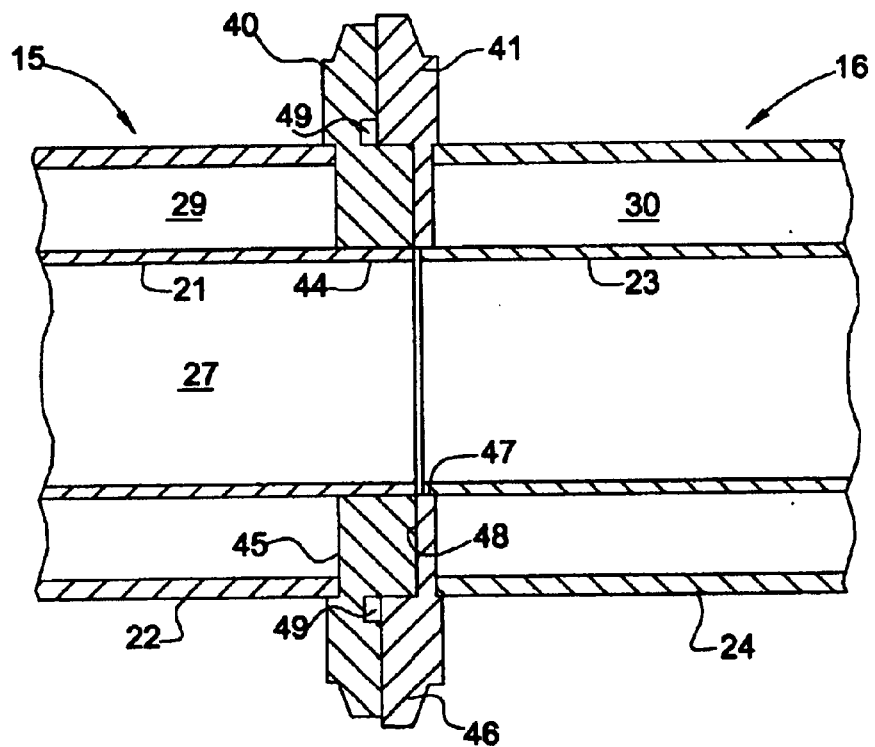
FIG. 3 is an enlarged, cross-sectional view of the portion of the transport line shown in FIG. 1, designated by the reference numeral 3.

FIG. 3 illustrates the connection of intermediate sections 15 and 16. Similar connections are provided between inlet section 14 and intermediate section 15, and intermediate section 16 and outlet section 17 to provide a material conveying passageway 27 consisting of the gas permeable conduits of the different sections, and a plurality of plenums 28, 29, 30 and 31 encompassing passageway 27 in sections 14, 15, 16 and 17, respectively.

The connection between sections 15 and 16 is typical of the conduit connections of the transport line. Such connection includes annular members 40 and 41 which connect together the cylindrical inner and outer cylindrical portions of sections 15 and 16. Annular member 40 is secured to a set of ends of conduits 21 and 22 to form an end wall of plenum 29, and is provided with an outer diameter greater than the diameter of conduit 22 so that it extends outwardly therefrom, and an inner diameter approximately equal to the diameter of conduit 21 to provide an opening 44 forming a part of passageway 27. Opening 44 further is provided with an enlarged portion 45 for receiving outer conduit 22 therein, and the opposite side of annular member 40 is provided with an annular recess 46. Annular member 41 is secured by welding to conduits 23 and 24 to form an end wall of plenum 30 and has an outer diameter approximately equal to the diameter of annular member 40 and an inner diameter approximately equal to the inner diameter of conduit 23 form a continuation of passageway 27 of section 15. Opening 47 of annular member 41 is enlarged as at 48 to permit annular members 40 and 41 to be mated together as shown in FIG. 3. The radially outer ends of annular members 40 and 41 may be permanently or detachably connected together by welding, clamping, bolting or other means. Preferably, such members are detachably connected together to provide flexibility in making up transport lines of different lengths and configurations, and further to permit the transport line to be disassembled for cleaning, maintenance and other purposes. It further will be appreciated that a coupling member 40 is intended to be provided on one end of a section of the transport line and a coupling member 41 is provided on the other end of such section to permit the various sections of a transport line to be coupled together as shown in FIG. 3. An O-ring 49 is provided between annular members 40 and 41. Other suitable sealing means may be provided to seal the connections between adjoining sections.

Hopper 12 may consist of a stand alone piece of equipment or the lower section of a vessel holding a supply of material to be conveyed through transport line 11. It includes an upper cylindrical wall 60 formed of a gas impermeable material and an inverted, frusto-conically configured section 61 provided with a lower discharge opening communicating with the inlet of transport line conduit 14. Disposed within the hopper and spaced from sections 60 and 61 respectively is an annular wall member 62 and an inverted, frusto-conically configured wall member 63 formed of a gas permeable material. Material disposed in hopper 12 is intended to be gravity or force fed into conduit 14. To control such feed of material, a slide valve 64 may be provided in conduit 14, adjacent the discharge end of the hopper, operated by an air cylinder assembly 65.

Gas under pressure, usually air, is injected into passageway 27 to impel material fed into passageway 27 of the transport line from hopper 12 through valve 64, by means of a nozzle 70. At least one such nozzle is utilized which is positioned adjacent the inlet of the transport line. Such nozzle is displaceable along the length thereof to permit adjustment of the outlet of the nozzle within passageway 27 to correspondingly alter the flowability of material fed into passageway 27 through the transport line. As may be required, and particularly where a change of direction of the transport line occurs, additional nozzles may be provided to maintain the desired flowability of material being conveyed through the transport line. As shown in FIG. 1a, the extent of the projection of nozzle 70 into passageway 27 may be varied manually or mechanically to correspondingly alter the flow conditions of material in passageway 27.

The gas supply line 13 is adapted to be connected to a source of gas under pressure, typically at a pressure in the range of 80 to 100 psi, and functions to provide air pressure to provide the motive force in conveying material through passageway 27 of the transport line and further to facilitate such flow. It includes a solenoid operated, two-way master valve 80, a branch line 81 on an upstream side of line 13 relative to master valve 80, and branch lines 82, 83 and 84 on the downstream side of master valve 80. Branch line 81 connects to air cylinder assembly 65 and is provided with a solenoid operated, four way valve 85 for opening and closing valve 64. Branch line 82 is connected to nozzle 70 and is provided with a flow control valve 86. In applications where additional nozzles may be provided for inducing flow in passageway 27, such nozzles further may be supplied with gas under pressure by branch line 82 and sub-branches thereof. Branch line 83 is connected to the plenum in hopper 12 disposed between the gas permeable and impermeable walls thereof to provide for the flow of gas through permeable walls 62 and 63 to fluidize the flow of material through hopper 12 into passageway 27 of the transport line. The supply of such fluidizing gas in branch line 83 may be controlled by a flow control valve 87.

Main supply line 13 further is provided with branch lines 90 through 93 which connect with plenums 28 through 31, respectively. Supply line 13 also is provided with flow control valve 94 and branch lines 90 through 93 are provided with flow control orifices 95 through 98, respectively. The diameters of orifices 95 through 98 vary so as to correspondingly vary the pressures in plenums 28 through 31. In one mode of operation, orifices 95 through 98 are selected to progressively reduce the pressure in plenums 28 through 31 along the length of passageway 72. Alternatively, adjustable pressure regulating valves or flow regulating valves may be used in lieu of orifices 95 through 98 to permit a variation in pressures in plenums 28 through 31.

Figure 2:
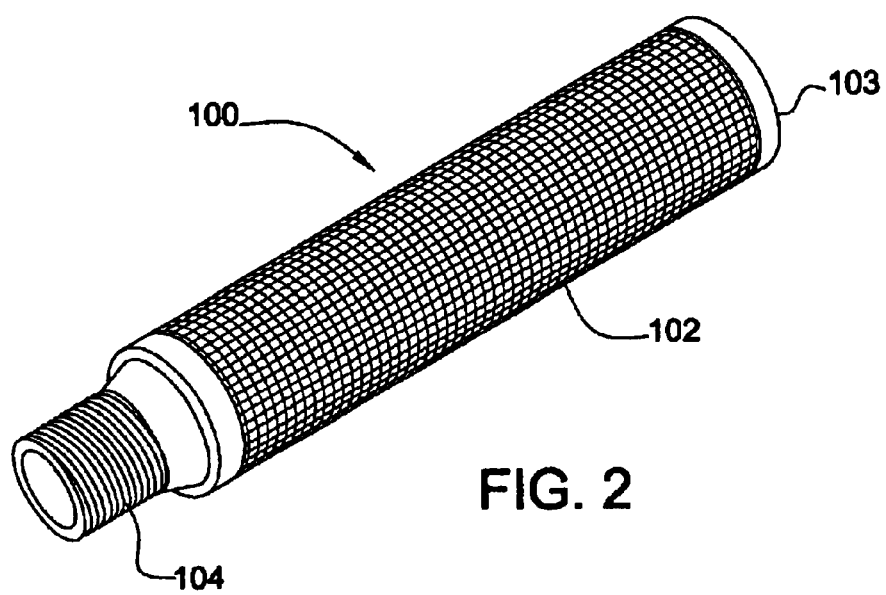
FIG. 2 is an enlarged, perspective view of a sound muffling member designated by the numeral 2 in FIG. 1.

Branch line 84 functions as an exhaust line for the system. It is provided with a sound muffling member 100 at the end thereof and a solenoid operated, quick opening, high capacity, two-way valve 101. Sound muffling device 100 is best shown in FIG. 2 and is seen to consist of an elongated, cylindrical wall 102 formed of a gas permeable material similar to the material from which conduits 19, 21, 23 and 25 are formed, a closed end wall 103 and a threaded end 104 permitting the member to be threaded into branch line 84. Solenoid operated valves 80 and 101 are operatively connected so that when valve 80 is opened to pressurize the system, valve 101 will be closed, and when valve 101 is opened to exhaust the system, valve 80 will be closed. When the system is pressurized and it is desired to discontinue operation and exhaust the system, valve 80 is closed and valve 101 is caused to quickly open to permit gas under pressure in the system to be rapidly exhausted through sound muffling device 100. As such gas is exhausted through device 100, it is caused to diffuse through the permeable material of cylindrical wall 102 which has the effect of muffling the sound of the diffused, exhausting gas. The solenoid operating valve 101 may be energized by a selected signal generated by any type of sensor unit such as a weighing unit provided either in the material supply or the receptacle or other device to which the material is conveyed.

In the operation of the system as described to convey material deposited in hopper 12 through transport line 11 to another container, another transport line or a processing apparatus, valve 80 is first opened and valve 101 is caused to close to pressurize the system. Under such conditions, fluidizing gas is supplied to hopper 12 and plenums 28 through 31 upon opening valves 87 and 94. Gas under pressure for impelling material in passageway 27 further is provided by opening valve 86. Valve 85 is then operated to open valve 64 and thus allow material from hopper 12 to be gravity fed into passageway 27 to be impelled through the transport line by high velocity gas injected through nozzle 70 and any other similar nozzles provided in the transport line. The flow of material through passageway 27 is enhanced by fluidizing gas flowing through the gas permeable walls of conduit sections 19, 21, 23 and 25 which forms a boundary layer of highly fluidized material having a very low viscosity between the material flow in passageway 27 and conduit sections 19, 21, 23 and 26. When it is desired to discontinue conveying material and shut down the system, valve 85 is operated to close valve 64 and thus discontinue the feed of material into passageway 27, valve 80 is closed to stop the flow of fluidizing gas into main supply line 13 and valve 101 is opened to permit gas under pressure in the system to exhaust through sound muffling device 100. The diffusion of the high pressure gas caused by the passage of such gas through permeable wall portion 102 of device 100 functions to substantially reduce the sound level of the rapidly exhausting gas. Such rapid depressurization of main supply line 13 allows conveying action to be stopped quickly, making such system particularly effective in accurately metering material.

Figure 4:
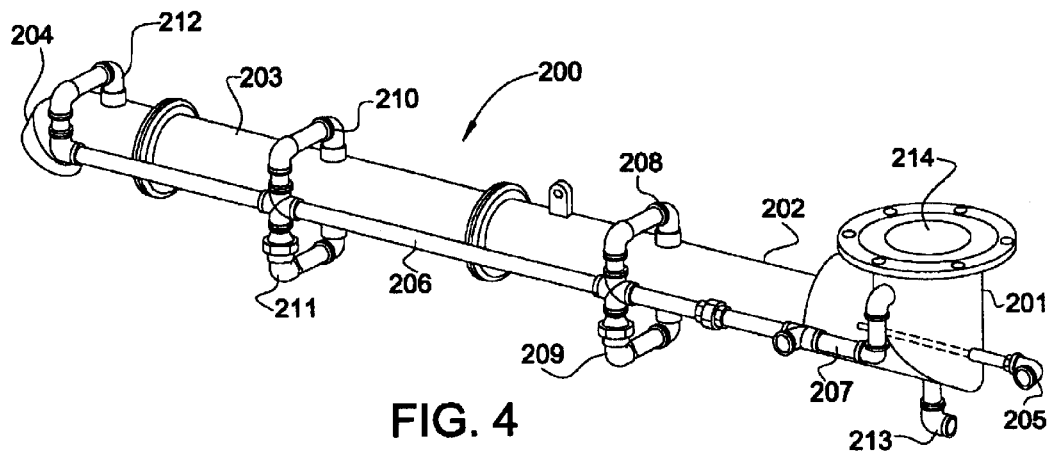
FIG. 4 is a perspective view of the transport line shown in FIG. 1, modified to include means for breaking up plugs of material formed in the material passageway of the line.
Figure 6:
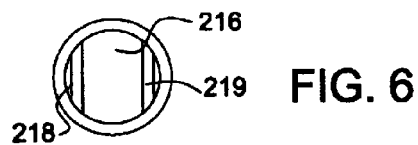
FIG. 6 is a top view of the insert shown in FIG. 6.
Figure 5:
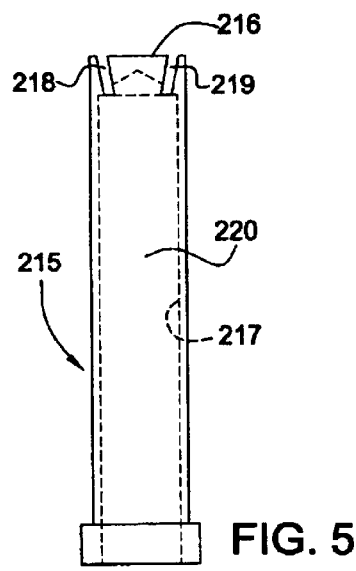
FIG. 5 is an enlarged, side elevational view of a nozzle insert used in the transport line shown in FIG. 4.
Figure 7:
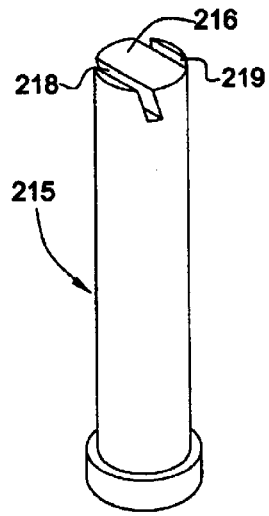
FIG. 7 is a perspective view of the insert shown in FIG. 5.

Referring to FIG. 4 of the drawings, there is illustrated a material transport line 200 which is similar in construction and operation to material transport line 11 shown in FIGS. 1 through 3 but modified to accommodate cohesive materials likely to plug the material passageway and thus obstruct the conveyance of material. The modified line consists of an inlet section 201, at least two intermediate sections 202 and 203 and an outlet section 204 comparable to conduit sections 14 through 17 of material transport line 11, a nozzle 205 for injecting a high velocity stream of gas into the material passageway of the line for impelling material therethrough, and a gas supply line 206 having branch lines 207 through 212 for supplying fluidizing gas to the plenums encompassing the material passageway in conduit sections 201 through 204. The line further is provided with a nozzle 213 mounted in a bottom wall of inlet section 201 directed upwardly along the axis of opening 214 of the inlet section. Provided in nozzle 213 with its inner end disposed flush with the inner surface of the inner conduit of section 201 defining the material passageway therethrough, is an insert 215 as shown in FIGS. 5 through 7. The insert is generally tubular in configuration having a closed end wall 216 providing a chamber 217 open at an outer end communicating with a source of gas under pressure through nozzle 213. Formed in closed end wall 216 is a pair of slots 218 and 219 which intercommunicate chamber 217 with the exterior of the insert. Slots 218 and 219 lie in substantially converging planes disposed at angles relative to a plane passing through a centerline 220 of the insert. When insert 215 is inserted in nozzle 213, its centerline 220 will be disposed substantially coaxially with the axis of inlet opening 214 of inlet section 201 so that air under pressure supplied to nozzle 213 will be caused to flow through chamber 217 and slots 218 and 219 and be injected in two planar sheets of high velocity gas to agitate and thus break up any material forming a plug in the material passageway of inlet section 201. The divergent orientation of slots 218 and 219 is particularly effective in injecting sheets of high velocity gas at the outer sides of the plug and thus dislodge the material forming the plug and causing it to disintegrate and become entrained in the motive gas injected through nozzle 205. In addition to providing an insert 215 in nozzle 213 for dislodging plugged material in the upper end of inlet section 201, a similar insert may be provided in nozzle 205 for dislodging material forming a plug in the lower end of such section.

The system as described not only effectively and efficiently conveys a bulk particulate material but can be adjusted to vary the flow characteristics of the material. Such adjustment can be provided by axially displacing nozzle 70 and any other nozzles provided in the system, varying the pressures of the fluidizing gases supplied through plenums 28 through 31 through the use of orifices 95 through 98 of different sizes and varying the size of the outlet of the transport line through the use of different outlet sections 31 having different outlet cross sectional areas such as interchangeable section 18. In most applications, it is contemplated that air be used as the conveying medium under an initial supply pressure in the range of 80 to 100 psi. In special applications, other gases may be used depending on the material being conveyed and its potential interaction with the conveying medium. In addition, such gases may be dried, heated, chilled or otherwise treated to accommodate any special conditions of the material being conveyed. The components of the transport line may be fabricated of any suitable materials allowing for the impelling of the material through a passageway provided with a boundary layer of fluidized material and the adjustment of the pressurization of the fluidizing gas along the length of the transport line.

The transport line may be arranged in any desired configuration. The entire line or components thereof can be arranged horizontally, inclined upwardly or downwardly or vertically. If such configuration is either inclined upwardly or vertically and flow is in the dense phase, a material head pressure or gas surcharge pressure would be required in the supply hopper if the material is to flow at a rate comparable to the flow rate of the material horizontally or inclined downwardly. If such additional pressure is not provided, material flow could be reduced and dilution may occur due to the increased injection of motive air.

The quick opening exhaust valve in the supply line of the system primarily is intended to be used when the transport line is used to meter a material and material flow must be stopped quickly in response to a fed-back weight signal from either the supply or destination of the material. In any mode of operation, however, such valve functions not only to exhaust pressure in the transport line but serves as a noise abatement device. The valve makes noise when it opens, thus requiring a silencer. Based on measurement of noise emission from a single pulse at 100 psig, the noise reduction of the nozzle has been found to be about 25 dBA.

Regarding the supply of air to the plenums of the transport line which permeates the inner conduits to enhance the flow of material within the material flow passageway, it is believed that such supply forms a boundary layer of highly fluidized material having a very low viscosity. Such layer enables the flow of the mass of less fluid material through the line with low frictional resistance.

The use of a valve between the material supply means and the transport line is optional. Generally, it is required only for material which becomes very fluid and tends to retain fluidizing air.

Although the inner conduit of the transport line defining the material flow passageway has been illustrated as being of circular cross-section, conduits of other cross-sectional configurations may be utilized within the scope of the invention. In particular, it has been found that the use of a cross-sectional configuration provided with converging sides and rounded upper and lower sides has been effective in providing improved flow for certain materials compared to a conventional circular cross-sectional configuration. In addition, although the embodiment described has been indicated as having at least two intermediate sections, it should be understood that the transport line may include just a single intermediate section.

It further is contemplated that the present invention can be used in either dilute or dense phase conveyance with a suitable pressure drop, gas flow rate and conveying rate without any line plugging, product degradation or undue wear of the system.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. A system adapted for pneumatically conveying a bulk particulate material comprising:
   a first conduit formed of a gas permeable material having an inlet and an outlet;
   a second conduit formed of a impermeable material encompassing and spaced from said first conduit;
   a plurality of partition walls disposed between said conduits and spaced along the lengths thereof, providing a plurality of plenums;
   means connectable to a source of gas under pressure for injecting gas under pressure into said first conduit to impel material deposited therein;
   each of said plenums having means for supplying a gas under pressure thereto; and
   each of said plenum gas supplying means including a regulating means therein.

2. A system according to claim 1 wherein said regulating means functions to vary the pressures in said plenums.

3. A system according to claim 1 wherein said regulating means function to decrease the pressures in said plenums in a direction from said inlet to said outlet of said first conduit.

4. A system according to claim 1 wherein said regulating means comprise fixed orifices.

5. A system according to claim 1 wherein the cross sectional areas of said orifices vary to provide varying pressures in said plenums.

6. A system according to claim 1 wherein the cross sectional areas of said orifices vary to provide decreasing pressures in said plenums in a direction from said inlet to said outlet of said first conduit.

7. A system according to claim 1 wherein said regulating means comprise pressure regulating valves.

8. A system according to claim 7 wherein said valves are set at different pressures.

9. A system according to claim 7 wherein said valves are set to provide reduced pressures in said plenums in a direction from said inlet to said outlet of said first conduit.

10. A system according to claim 1 including a material holding means having an outlet communicating with said inlet of said first conduit.

11. A system according to claim 10 including means for fluidizing said material in said holding means for enhancing the flowability of material therein.

12. A system according to claim 10 including a valve disposed between said holding means and said first conduit inlet.

13. A system according to claim 1 wherein said gas injecting means comprises at least one nozzle.

14. A system according to claim 13 wherein said nozzle projects into said first conduit and is displaceable along a length thereof.

15. A system according to claim 1 wherein said conduits form a material transport line including a main body segment and multiple, interchangeable outlet segments having first conduit sections of different cross-sectional areas, selectively, detachably mountable on said main body segment.

16. A system according to claim 1 including means for exhausting said first conduit and said plenums, and wherein said exhausting means includes a valve and sound muffling means.

17. A system adapted for pneumatically conveying bulk particulate materials comprising:
   a material transporting line including a first conduit formed of a gas permeable material providing a material flow passageway having an inlet and an outlet, a second conduit formed of a gas impermeable material, encompassing and spaced from said first conduit, and a plurality of partition walls disposed between said conduits and spaced along the lengths thereof, defining a plurality of plenums;
   a nozzle connectable to a source of gas under pressure inserted into said passageway for injecting gas under pressure therein to impel material disposed in said passageway toward the outlet thereof;
   a main gas supply line connectable to a source of gas under pressure having branch lines each communicable with a plenum; and
   each of said branch lines having a regulating means.

18. A system according to claim 17 wherein said regulating means function to vary the pressures in said plenums.

19. A system according to claim 18 wherein said pressure regulating means function to reduce the pressures in said plenums in a direction from said inlet to said outlet of said passageway.

20. A system according to claim 17 wherein said regulating means comprise fixed orifices.

21. A system according to claim 20 wherein the cross-sectional areas of said orifices vary to provide varying pressures in said plenums.

22. A system according to claim 20 wherein the cross sectional areas of said orifices vary to provide decreasing pressures in said plenums in a direction from said inlet to said outlet of said passageway.

23. A system according to claim 17 wherein said regulating means comprise pressure regulating valves.

24. A system according to claim 23 wherein said valves are set at different pressures.

25. A system according to claim 17 including a material holding means having an outlet communicating with said passageway inlet.

26. A system according to claim 25 wherein said holding means includes a frusto-conically configured gas impermeable wall section having an outlet communicating with said passageway inlet, and a frusto-conically configured wall formed of a gas permeable material spaced from said gas impermeable wall section, and including a branch line intercommunicating said main gas supply line and said space between said wall sections.

27. A system according to claim 25 including a valve disposed between said holding means and said material transport line.

28. A system according to claim 27 wherein said valve is operated by a gas actuated cylinder assembly, and including branch lines intercommunicating said main gas supply line and said gas actuated cylinder assembly, and a selector valve disposed in said branch line.

29. A system according to claim 17 wherein said nozzle is displaceable along the length thereof.

30. A system according to claim 17 including a branch line intercommunicating said main gas supply line and said nozzle, and a valve disposed in said branch line 31. A system according to claim 17 wherein said material transport line includes a main body segment and multiple, interchangeable outlet segments having first conduit sections of different cross sectional areas, selectively, detachably mountable on said main body segment.

32. A system according to claim 17 including an exhaust line communicating with said main gas supply line, and means provided in said exhaust line for muffling sound.

33. A system according to claim 32 wherein said sound muffling means comprises a conduit closed at one end and formed of a gas permeable material.

34. A system according to claim 32 including a valve disposed in said exhaust line.

35. A system according to claim 32 including a master valve disposed in said main gas supply line between said source of gas under pressure and said exhaust line, and a flow control valve disposed in said exhaust line.

36. A system according to claim 35 wherein each of said master and exhaust line valves is operable to open when the other thereof closes and to close when the other thereof opens.

37. A system according to claim 36 wherein said sound muffling means comprises a conduit closed at one end and formed of a gas permeable material.

38. A system according to claim 36 wherein said master and exhaust line valves are solenoid operated valves.

39. A system according to claim 16 wherein said valve is a quick opening valve.

40. A system according to claim 39 wherein said valve is operable to open responsive to a selected signal.

41. A system according to claim 34 wherein said valve is a quick opening valve.

42. A system according to claim 41 wherein said valve is operable to open responsive to a selected signal.

43. A system according to claim 42 wherein said signal is generated from a material weighing unit.

44. A system according to claim 1 wherein said means for supplying a gas under pressure to said plenum functions to provide sufficient gas penetrating said first conduits to form a boundary layer of highly fluidized material having a low viscosity.

45. A system according to claim 17 wherein said gas supply line function to provide a sufficient gas penetrating said first conduit to form a boundary layer of highly fluidized material having a low viscosity.

46. A system according to claim 1 wherein said regulatory means comprises a flow regulating means.

47. A system according to claim 17 wherein said regulating means comprises a flow regulating means.

* * * * *